US011370384B2

United States Patent
Mendenhall et al.

(10) Patent No.: US 11,370,384 B2
(45) Date of Patent: Jun. 28, 2022

(54) COOL BURNING GAS GENERANT COMPOSITIONS WITH LIQUID COMBUSTION PRODUCTS

(71) Applicant: AUTOLIV ASP, INC., Ogden, UT (US)

(72) Inventors: Ivan V. Mendenhall, Providence, UT (US); Gary K. Lund, Malad City, ID (US); Steven M. Cannon, Elwood, UT (US)

(73) Assignee: Autoliv ASP, Inc., Ogden, UT (US)

( * ) Notice: Subject to any disclaimer, the term of this patent is extended or adjusted under 35 U.S.C. 154(b) by 193 days.

(21) Appl. No.: 16/555,709

(22) Filed: Aug. 29, 2019

(65) Prior Publication Data
US 2021/0061218 A1  Mar. 4, 2021

(51) Int. Cl.
| | |
|---|---|
| *B60R 21/264* | (2006.01) |
| *C06D 5/06* | (2006.01) |
| *C06B 31/00* | (2006.01) |
| *B60R 21/261* | (2011.01) |
| *B60R 21/239* | (2006.01) |

(52) U.S. Cl.
CPC ........ *B60R 21/2644* (2013.01); *B60R 21/239* (2013.01); *B60R 21/261* (2013.01); *C06B 31/00* (2013.01); *C06D 5/06* (2013.01)

(58) Field of Classification Search
None
See application file for complete search history.

(56) References Cited

U.S. PATENT DOCUMENTS

| | | | |
|---|---|---|---|
| 5,501,823 A | 3/1996 | Lund et al. | |
| 5,516,377 A | 5/1996 | Highsmith et al. | |
| 5,682,014 A | 10/1997 | Highsmith et al. | |
| 5,935,118 A | 8/1999 | Gryskiewicz et al. | |

(Continued)

OTHER PUBLICATIONS

Carbajo, J. A., "Thermodynamic Description of the Binary Cu—Bi System," Masters Thesis, National Dong Hwa University (2016), 22 pages <URL: https://hdl.handle.net/2454/22844><Retrieved online: Aug. 29, 2019>.

*Primary Examiner* — Aileen B Felton
(74) *Attorney, Agent, or Firm* — Harness, Dickey & Pierce, P.L.C.; Stephen T. Olson (57) ABSTRACT

Cool burning gas generant compositions for an automotive inflatable restraint system are provided that include a bismuth-containing compound selected from the group consisting of: bismuth citrate, bismuth subsalicylate, bismuth hydroxide, copper bismuth hydroxy nitrate, bismuth subcarbonate, bismuth suboxalate, and combinations thereof. The gas generant comprises at least one copper-containing component. The gas generant includes at least one oxidizer, fuel, and optional coolant. The maximum flame temperature at combustion ($T_c$) of less than or equal to about 1700K (1,427° C.). The cool burning gas generant composition generates liquid phase combustion products making it suitable for use in a filterless inflatable restraint system. Copper and bismuth present in the cool burning gas generant composition react to form an alloy having a melting point at or near the maximum flame temperature at combustion ($T_c$).

19 Claims, 5 Drawing Sheets

Combustion By-products of Formulation 1

(56) References Cited

U.S. PATENT DOCUMENTS

| | | | |
|---|---|---|---|
| 5,970,703 A | 10/1999 | Hinshaw et al. | |
| 6,221,187 B1 | 4/2001 | Knowlton et al. | |
| 6,224,099 B1* | 5/2001 | Nielson | C06C 5/00 |
| | | | 280/741 |
| 6,277,296 B1 | 8/2001 | Scheffee et al. | |
| 6,689,237 B1* | 2/2004 | Mendenhall | C06D 5/06 |
| | | | 149/36 |
| 6,958,101 B2 | 10/2005 | Mendenhall et al. | |
| 6,969,435 B1 | 11/2005 | Hinshaw et al. | |
| 7,959,749 B2 | 6/2011 | Burns et al. | |
| 8,092,623 B1 | 1/2012 | Cramer et al. | |
| 8,097,103 B2 | 1/2012 | Taylor et al. | |
| 8,221,565 B2 | 7/2012 | Mendenhall et al. | |
| 8,657,333 B2 | 2/2014 | Young et al. | |
| 8,794,666 B2 | 8/2014 | Patton et al. | |
| 8,808,476 B2 | 8/2014 | Mendenhall et al. | |
| 8,815,029 B2 | 8/2014 | Lund et al. | |
| 9,221,420 B2 | 12/2015 | Laubacher et al. | |
| 2002/0007886 A1* | 1/2002 | Neidert | A62C 13/22 |
| | | | 149/49 |
| 2014/0261927 A1 | 9/2014 | Mendenhall et al. | |
| 2017/0334802 A1* | 11/2017 | Rambow | C06B 25/00 |

* cited by examiner

Combustion By-products of Formulation 1

FIG. 1

Combustion By-products of Comparative Formulation 2

FIG. 2

COOL BURNING GAS GENERANT COMPOSITIONS WITH LIQUID COMBUSTION PRODUCTS

FIELD

The present disclosure relates to cool burning gas generant compositions capable of generating liquid combustion products at cool maximum flame temperatures.

BACKGROUND

This section provides background information related to the present disclosure which is not necessarily prior art.

Passive inflatable restraint systems are part of safety systems used in various applications, such as automobiles. Certain types of passive inflatable restraint systems minimize occupant injuries by using a pyrotechnic gas generant to inflate an airbag cushion (e.g., gas initiators and/or inflators) or to actuate a seatbelt tensioner (e.g., micro gas generators), for example. Automotive airbag inflator performance and safety requirements are continually increasing to enhance passenger safety, while concurrently striving to increase functionality and reduce manufacturing costs.

Suitable gas generants provide sufficient gas mass flow in a desired time interval to achieve a required work impulse for the inflating device. Gas generant performance can be optimized and system cost reduced by reducing the combustion flame temperature of the gas generant formulation. Although gas temperature influences the amount of work the generant gases can do, high gas temperatures are undesirable because burns and related thermal damage can result. In addition, high gas temperatures can also lead to an excessive reliance or sensitivity of the gas to heat transfer and excessively rapid deflation profiles, which can be undesirable. In order to mitigate the effects of high combustion flame temperatures (for example, a high flame temperature may be considered anything in excess of 1700K at combustion), a significant portion of the mass of an inflator is often relegated to heat sink in combination with filtration systems. This detrimentally impacts the weight of the inflator and thus the efficiency of the system. Consequently, it is desirable to achieve a high gas output at a high mass flow rate and at relatively low flame temperature in a gas generant formulation.

Gas generant formulations that have flame temperatures less than approximately 1700 K have been shown to enable inflator devices with reduced filtration that provide adequate restraint and protection without the risk of burns or injury to an automobile occupant in the event of a crash. However, a remaining challenge to this approach is how to reduce or remove filtration from the inflator and still meet the specification limit for maximum particulate matter permitted to be expelled during deployment of the inflator. Hence, for new advanced inflator designs, it is desirable to reduce or minimize filter components and heat sink requirements as much as possible. As part of these new designs, new cool burning gas generant formulations are advantageous because they reduce filtration and heat sink requirements, while improving performance.

SUMMARY

This section provides a general summary of the disclosure, and is not a comprehensive disclosure of its full scope or all of its features.

Advantageously, the present disclosure in certain variations provides a cool burning gas generant composition for an automotive inflatable restraint system comprising: a bismuth-containing compound selected from the group consisting of: bismuth citrate, bismuth subsalicylate, bismuth hydroxide, copper bismuth hydroxy nitrate, bismuth subcarbonate, bismuth suboxalate, and combinations thereof, an oxidizer, and a fuel. The cool burning gas generant composition comprises copper and has a maximum flame temperature at combustion ($T_c$) of less than or equal to about 1700K (1,427° C.).

In one aspect, the bismuth-containing compound is an oxidizer comprising copper bismuth hydroxy nitrate ($[Cu_2Bi(OH)_6]NO_3$).

In one aspect, the bismuth-containing compound is a co-fuel selected from the group consisting of: bismuth citrate $Bi(C_6H_5O_7)$, bismuth subsalicylate ($C_7H_5BiO_4$), and combinations thereof.

In one aspect, the bismuth-containing compound is a coolant selected from the group consisting of: bismuth hydroxide ($Bi(OH)_3$), bismuth subcarbonate ($Bi_2O_2CO_3$), bismuth suboxalate ($BiC_2O_4(OH)$), and combinations thereof.

In one aspect, the bismuth-containing compound is present at greater than or equal to about 2 to less than or equal to about 30 weight % of the cool burning gas generant composition.

In one aspect, a linear burn rate of greater than or equal to about 11 mm per second at a pressure of about 20 megapascals (MPa) and a gas yield of the cool burning gas generant composition of greater than or equal to about 5.7 moles/100 cm$^3$.

In one aspect, the fuel is selected from the group consisting of: guanidine nitrate, diammonium 5,5'-bitetrazole (DABT), copper bis guanylurea dinitrate, hexamine cobalt (III) nitrate, copper diammine bitetrazole, and combinations thereof.

In one aspect, the oxidizer is selected from the group consisting of: basic copper nitrate, copper bis guanylurea dinitrate, alkali metal or alkaline earth metal nitrates, alkali metal, alkaline earth metal, or ammonium perchlorates, metal oxides, and combinations thereof.

In one aspect, the cool burning gas generant composition is configured to generate combustion products in a liquid phase. Copper and bismuth present in the cool burning gas generant composition react to form an alloy having a melting point at or within 50K of the maximum flame temperature at combustion ($T_c$) of the cool burning gas generant composition.

In one aspect, the cool burning gas generant composition further comprises a coolant present at greater than or equal to about 0 to less than or equal to about 20 weight % of the cool burning gas generant composition.

Advantageously, the present disclosure in certain other variations provides a cool burning gas generant composition for an automotive inflatable restraint system comprising: a bismuth-containing compound selected from the group consisting of: bismuth citrate, bismuth subsalicylate, bismuth hydroxide, copper bismuth hydroxy nitrate, bismuth subcarbonate, bismuth suboxalate, and combinations thereof. The bismuth-containing compound is present at greater than or equal to about 2 to less than or equal to about 30 weight % of the cool burning gas generant composition. The cool burning gas generant also comprises a fuel present at greater than or equal to about 10% to less than or equal to about 50% by weight of the cool burning gas generant composition. The cool burning gas generant also comprises a copper-containing oxidizer present at greater than or equal to about 30% to less than or equal to about 75% by weight of the cool burning gas generant composition. The cool burning gas generant composition has a maximum flame temperature at combustion ($T_c$) of less than or equal to about 1700K (1,427° C.). Furthermore, the cool burning gas generant composition is configured to generate combustion products in a liquid phase.

In one aspect, a copper-containing oxidizer comprises basic copper nitrate as a first oxidizer and copper bis guanylurea dinitrate as a second oxidizer and the fuel is selected from the group consisting of: guanidine nitrate, diammonium 5,5'-bitetrazole (DABT), copper bis guanylurea dinitrate, hexamine cobalt (III) nitrate, copper diammine bitetrazole, and combinations thereof.

In one aspect, the bismuth-containing compound is a co-fuel selected from the group consisting of: bismuth citrate ($Bi(C_6H_5O_7)$), bismuth subsalicylate ($C_7H_5BiO_4$), and combinations thereof.

In one aspect, the cool burning gas generant composition is configured to generate combustion products in a liquid phase. Copper and bismuth present in the cool burning gas generant composition react to form an alloy having a melting point at or within 50K the maximum flame temperature at combustion ($T_c$) of the cool burning gas generant composition.

In one aspect, the cool burning gas generant composition further comprises a coolant present at greater than or equal to about 0 to less than or equal to about 20 weight % of the cool burning gas generant composition.

In one aspect, copper and bismuth present in the cool burning gas generant composition react to form an alloy having a melting point at or near the maximum flame temperature at combustion ($T_c$) of the cool burning gas generant composition.

Advantageously, the present disclosure in certain variations provides a method of inflating a filterless automotive inflatable restraint system comprising: combusting a cool burning gas generant in a filterless inflator device at a maximum flame temperature at combustion ($T_c$) of less than or equal to about 1700K (1,427° C.) to generate gas and combustion products in a liquid phase. The cool burning gas generant comprises a bismuth-containing compound selected from the group consisting of: bismuth citrate, bismuth subsalicylate, bismuth hydroxide, copper bismuth hydroxy nitrate, bismuth subcarbonate, bismuth suboxalate, and combinations thereof, at least one copper-containing oxidizer, and at least one fuel. The method further comprises plating the liquid combustion products on exposed surfaces of the filterless inflator device.

In one aspect, a tank residue after the plating is less than or equal to about 1 gram.

In one aspect, copper and bismuth react to form an alloy having a melting point at or within 50K of the maximum flame temperature at combustion ($T_c$) of the cool burning gas generant.

In one aspect, the bismuth-containing compound is present at greater than or equal to about 2 to less than or equal to about 30 weight % of the cool burning gas generant. The at least one fuel comprises guanidine nitrate and is present at greater than or equal to about 10% to less than or equal to about 50% by weight of the cool burning gas generant. The at least one copper-containing oxidizer is selected from the group consisting of: basic copper nitrate, copper bis guanylurea dinitrate, and combinations thereof. The at least one copper-containing oxidizer is present at greater than or equal to about 30% to less than or equal to about 75% by weight of the cool burning gas generant. The cool burning gas generant further comprises coolant present at greater than or equal to about 0 to less than or equal to about 20 weight % of the cool burning gas generant.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIGS. 4A-4B show combustion byproducts after combustion of a comparative gas generant formulation as compared to FIGS. 4C-4D that show combustion products of cool burning gas generant composition comprising a bismuth-containing compound prepared in accordance with certain aspects of the present disclosure.

Corresponding reference numerals indicate corresponding parts throughout the several views of the drawings.

DETAILED DESCRIPTION

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of" any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Unless otherwise indicated, amounts expressed in weight and mass are used interchangeably, but should be understood to reflect a mass of a given component.

As used herein, the terms "composition" and "material" are used interchangeably to refer broadly to a substance containing at least the preferred chemical constituents, elements, or compounds, but which may also comprise additional elements, compounds, or substances, including trace amounts of impurities, unless otherwise indicated.

Example embodiments will now be described more fully with reference to the accompanying drawings.

The present disclosure provides a composition for gas generant that can be in the form of a solid grain, a pellet, a tablet, or the like. As the gas generant burns it creates a gas or effluent for inflation that is directed to an inflating device (e.g., airbag) within the inflatable restraint system. Various different gas generant compositions are used in vehicular occupant inflatable restraint systems. Gas generant material selection involves various factors, including meeting current industry performance specifications, guidelines and standards, generating safe gases or effluents, handling safety of the gas generant materials, durational stability of the materials, and cost-effectiveness in manufacture, among other considerations. Advantageously, gas generant compositions are provided that are safe during handling, storage, and disposal, and in certain aspects, azide-free.

In various aspects, the gas generant typically includes at least one fuel component, and at least one oxidizer component, and may include other minor ingredients, that once ignited combust rapidly to form gaseous reaction products (e.g., $CO_2$, $H_2O$, and $N_2$). One or more fuel compounds undergo rapid combustion to form heat and gaseous products; e.g., the gas generant burns to create heated inflation gas for an inflatable restraint device or to actuate a piston. The one or more oxidizing components react with the fuel component in order to generate the gas product. During combustion of conventional gas generants, "slag" or "clinker" are formed, which is another name for solid combustion products formed during combustion of the gas generant material. By "slagging," it is meant that certain solid combustion products generated during burning of the gas generant form a large integral solid mass that is retained inside the combustion chamber during combustion, rather than passing through a filter component of the inflator into the airbag. Ideally, the slag will maintain the original shape of the gas generant (e.g., grain, pellet, or tablet) and be large and easily filtered. This is particularly important when the inflator design includes a reduced mass filtration system for the purpose of reducing the inflator size and weight such as can be used with cool burning gas generant formulations.

Research on combustion chamber design has shown that to further reduce particulate output, ideally, the gas will contain liquid combustion by-products and flow in a tortuous path and impinge on many surfaces, so that the liquid combustion byproducts are "plated" out on surfaces inside the inflator. For example, cool burning gas generant formulations, for example, those with maximum combustion flame temperatures of 1600K-1700K or less have been considered for use with reduced filtration or filter-less inflator concepts. In certain variations, these formulations contain copper compounds, such as basic copper nitrate. The copper metal formed during combustion is a major constituent of the combustion by-products or "slag." However, because these compositions burn so cool, the copper metal in the combustion by-products is in solid form and does not plate out on interior surfaces of the inflator. As such, there still remains a need for filters to be present in the inflator to meet the pertinent specifications for particulate released during combustion.

In accordance with certain aspects, of the present disclosure, cool burning gas generant compositions are provided that generate molten or liquid combustion byproducts at combustion flame temperatures less than 1600K-1700K. These cool burning gas generant compositions are thus capable of coating or plating out on the internal surface of the inflator, serving to minimize and/or eliminate the need for traditional filters in the inflator design. Generally, it is advantageous if the gas generant composition generates combustion products where greater than or equal to about 60% are gaseous combustion products and the remainder of combustion products, for example, less than or equal to about 40% are non-gaseous, which traditionally have been in a solid phase. Of this remaining non-gaseous portion of combustion products generated, in various aspects of the present disclosure, advantageously greater than or equal to about 85% of these non-gaseous combustion products are molten (e.g., in a liquid or semi-liquid phase).

The present disclosure provides alternative cool burning gas generant compositions that allow low flame temperatures at combustion (e.g., ≥about 1400K (1,127° C.) to ≤about 1600K (1,327° C.)) to be obtained while maintaining good performance, especially those that can employ certain fuel and oxidizer combinations, like basic copper nitrate and guanidine nitrate. In various aspects, the present disclosure contemplates such a cool burning gas generant composition comprising a bismuth-containing compound that can interact with certain metals in the cool burning gas generant, such as copper, to ensure the combustion byproducts remain in a liquid phase. Thus, bismuth-copper alloys and reaction products may be generated during the combustion process.

In certain aspects, gas generant compositions are provided which comprise at least one copper-containing compound and at least one bismuth-containing compound. In certain variations, the gas generant composition may comprise basic copper nitrate as a primary oxidizer. The formulation must also contain a bismuth compound which during combustion forms bismuth metal that alloys with the copper metal to significantly reduce the melting point of the combustion by-products.

The bismuth-containing compound may be present as an oxidizer, such as copper bismuth hydroxy nitrate ($[Cu_2Bi(OH)_6]NO_3$), as a fuel/co-fuel, such as bismuth citrate $Bi(C_6H_5O_7)$, or bismuth subsalicylate ($C_7H_5BiO_4$) or as a coolant, such as bismuth hydroxide ($Bi(OH)_3$), bismuth subcarbonate ($Bi_2O_2CO_3$), bismuth suboxalate ($BiC_2O_4$(OH)). In certain variations, incorporation of a bismuth-containing compound in the form of a co-fuel is advantageous, because it reduces pressure sensitivity (burning rate slope) of the burning rate as compared to bismuth provided in other components. It should be noted that the bismuth-containing compound included in the cool burning gas generant composition is not intended to encompass either bismuth oxide or bismuth metal. While these compounds can be present, neither bismuth oxide or bismuth metal serves to particularly cool the gas generant formulation or promote formation of liquid or molten combustion products. Furthermore, as discussed below, bismuth oxide can result in undesirably high burn rate slopes when included in the gas generant. Additionally, the bismuth-containing compound is generally not intended to encompass ballistic modifiers in the form of bismuth oxide, salts, or complexes.

Thus, in certain aspects, the cool burning gas generant compositions may be substantially free of bismuth metal, bismuth oxide, salts, or complexes thereof as ballistic modifiers. The term "substantially free" as referred to herein is intended to mean that the compound or species is absent to the extent that undesirable and/or detrimental effects are negligible or nonexistent. For example, a gas generant that is "substantially free" of such compounds comprises less than or equal to about 1% by weight, optionally less than or equal to about 0.5% by weight, optionally less than or equal to about 0.1% by weight, and in certain preferred aspects, 0% by weight of the undesired bismuth species (bismuth metal, bismuth oxide, salts, or complexes thereof as ballistic modifiers).

It is understood that while general attributes of each of the above categories of components may differ, there may be some common attributes and any given material may serve multiple purposes within two or more of such listed classes or categories. For example, as will be described further herein, a source of copper may be basic copper nitrate that assists with transferring energy to the gas generant; however, may also serve as an oxidizer in the gas generant composition.

Thus, the present disclosure provides a relatively cool burning gas generant composition that comprises a bismuth-containing compound selected from the group consisting of bismuth citrate, bismuth subsalicylate, bismuth hydroxide, copper bismuth hydroxy nitrate, bismuth subcarbonate, bismuth suboxalate, and combinations thereof. As noted above, the bismuth-containing compound may be present as a fuel/co-fuel, oxidizer, or coolant, by way of example. In addition to the bismuth-containing compound, the gas generant composition may also comprise a primary fuel along with at least one oxidizer. In certain aspects, the gas generant composition comprises at least one copper-containing component, such as an oxidizer that comprises copper. A cool burning gas generant having combustion flame temperatures of less than approximately 1700K (1,427° C.) has been shown to enable inflator devices with reduced filtration or filtration-free systems, which operate in a manner that provides adequate restraint and protection, without the risk of burns or injury to an automobile occupant in the event of a crash.

Thus, minimizing flame temperature is advantageous. In certain aspects of the present technology, the gas generant composition may be a cool burning formulation having a maximum flame temperature at combustion ($T_c$) of less than or equal to about 1700K (1,427° C.), optionally less than or equal to about 1600K (1,327° C.), and in certain other aspects, optionally within a range of greater than or equal to about 1400K (1,127° C.) to less than or equal to 1600K (1,327° C.). A bismuth-containing compound as described above is combusted during the decomposition reaction of the gas generant and thus, the bismuth-containing compound advantageously interacts with copper present in the gas generant to form a cool burning gas generant composition that desirably promotes formation of liquid combustion byproducts.

An amount of bismuth-containing compound(s) present in the cool burning gas generant may be adjusted so that the melting point of the alloyed copper and bismuth in the combustion by products have a melting point at or near the combustion flame temperature of the formulation. This level of bismuth can be selected with reference to the binary phase diagram for copper and bismuth, such that bismuth-copper alloys are molten at a desired flame temperature.

In certain variations, the bismuth-containing compound is present at greater than or equal to about 2% by weight to less than or equal to about 30% by weight of the total gas generant composition. In other aspects, the bismuth-containing compound is present at greater than or equal to about 3% by weight to less than or equal to about 25% by weight of the total gas generant composition, optionally greater than or equal to about 5% by weight to less than or equal to about 20% by weight of the total gas generant composition, and in certain variations, optionally greater than or equal to about 10% by weight to less than or equal to about 15% by weight of the total gas generant composition.

When a bismuth-containing compound is selected to be a fuel, it may include bismuth citrate $Bi(C_6H_5O_7)$ and/or bismuth subsalicylate ($C_7H_5BiO_4$). The cool burning gas generants may also comprise one or more other fuels (in addition to the bismuth-containing compound when it is selected to be a fuel/co-fuel). As appreciated by those of skill in the art, such a fuel component may be combined with additional components in the gas generant, such as co-fuels when multiple fuels are employed or oxidizers. Most fuels known in the art can be used with the present technology and are generally selected to impart certain desirable characteristics to the gas generant formulation, such as gas yield, burning rate, thermal stability, low cost, and relatively low flame temperatures. These fuels can be organic compounds containing two or more of the elements: carbon (C), hydrogen (H), nitrogen (N), and oxygen (O). The fuels can also include transition metal salts and transition metal nitrate complexes. In certain variations, the transition metals are copper and/or cobalt. In accordance with certain aspects of the present teachings, a fuel is selected for the gas generant compositions so that when combusted with certain oxidizers comprising copper, such as basic copper nitrate, a resulting maximum combustion flame temperature ($T_c$) falls within a range of greater than or equal to about 1400K (1,127° C.) to less than or equal to 1600K (1,327° C.).

Examples of fuels useful for gas generants according to the present teachings are selected from the group consisting of guanidine nitrate, diammonium 5,5'-bitetrazole (DABT), copper bis guanylurea dinitrate, hexamine cobalt (III) nitrate, copper diammine bitetrazole, and combinations thereof. Fuels may be used singly or in combination with other co-fuels, in addition to the bismuth-containing compound, to impart the desired combustion characteristics. In addition to the bismuth-containing compound, the cool burning gas generant may comprise such additional fuel(s) at greater than or equal to about 10% by weight to less than or equal to about 50% by weight of the total gas generant composition. A suitable cool burning gas generant composition optionally includes a total amount of fuels, including the bismuth-containing compound, of greater than or equal to about 15% to less than or equal to about 80% by weight, optionally greater than or equal to about 25% to less than or equal to about 70%, optionally greater than or equal to about 30% to less than or equal to about 55% of all fuel components in the total gas generant composition.

As appreciated by those of skill in the art, such fuel components may be combined with additional components in the gas generant, such as oxidizers. For example, in certain embodiments, a gas generant composition comprises a substituted basic metal nitrate oxidizer, such as basic copper nitrate described above, and a nitrogen-containing fuel/co-fuel like guanidine nitrate. Examples of gas generant compositions having suitable burn rates, density, and gas yield for inclusion in the cool burning gas generants of the present disclosure include those described in U.S. Pat. No. 6,958,101 to Mendenhall et al., the relevant portion of which is herein incorporated by reference. The desirability of use of various co-fuels, such as guanidine nitrate or diammonium 5,5'-bitetrazole (DABT), in the gas generant compositions of the present disclosure is generally based on a combination of factors, such as burn rate, cost, stability (e.g., thermal stability), availability and compatibility (e.g., compatibility with other standard or useful pyrotechnic composition components).

Suitable bismuth-containing compound that may be an oxidizer include copper bismuth hydroxy nitrate ($[Cu_2Bi(OH)_6]NO_3$). Other suitable oxidizers for the gas generant compositions of the present disclosure include, by way of non-limiting example, alkali metal (e.g., elements of Group 1 of IUPAC Periodic Table, including Li, Na, K, Rb, and/or Cs), alkaline earth metal (e.g., elements of Group 2 of IUPAC Periodic Table, including Be, Ng, Ca, Sr, and/or Ba), and ammonium nitrates, nitrites, and perchlorates; metal oxides (including Cu, Mo, Fe, La, and the like, but excluding bismuth oxide, as discussed below); basic metal nitrates (e.g., elements of transition metals of Row 4 of IUPAC Periodic Table, including Mn, Fe, Co, Cu, and/or Zn); transition metal complexes of ammonium nitrate (e.g., elements selected from Groups 3-12 of the IUPAC Periodic Table); metal ammine nitrates, metal hydroxides, and combinations thereof. One or more co-fuel/oxidizers are selected along with the fuel component to form a gas generant that upon combustion achieves an effectively high burn rate and gas yield from the fuel. One non-limiting, specific example of a suitable oxidizer includes basic copper nitrate. The gas generant may include combinations of oxidizers, such that the oxidizers may be nominally considered a primary oxidizer, a second oxidizer, and the like.

Oxidizing agents may be respectively present in a gas generant composition in an amount of less than or equal to about 60% by weight of the gas generating composition; optionally less than or equal to about 50% by weight; optionally less than or equal to about 40% by weight; optionally less than or equal to about 30% by weight; optionally less than or equal to about 25% by weight; optionally less than or equal to about 20% by weight; and in certain aspects, less than or equal to about 15% by weight of the gas generant composition.

In certain aspects, the cool burning gas generant comprises basic copper nitrate oxidizer present in an amount of greater than or equal to about 25% by weight to less than or equal to about 75% by weight of the gas generating composition. A co-oxidizer may also be present at greater than or equal to 0% by weight to less than or equal to about 20% by weight of the gas generating composition. For example, a bismuth-containing oxidizer, such as copper bismuth hydroxy nitrate ($[Cu_2Bi(OH)_6]NO_3$), may be present from 0% to less than or equal to about 20% by weight of the gas generant composition.

In certain variations of the present disclosure, the gas generant composition comprises a total amount of oxidizers of greater than or equal to about 30% to less than or equal to about 70% by weight and in certain variations, optionally greater than or equal to about 35% to less than or equal to about 60% by weight of the total gas generant composition. Where a secondary oxidizer, such as a perchlorate, is included in combination with a primary oxidizer, such as basic copper nitrate, it may be limited to an amount of greater than or equal to about 1% by weight to less than or equal to about 10% by weight of the total gas generant composition to retain the cool burning properties of the gas generant. As noted above, where a bismuth-containing oxidizer is included, it may be present in an amount of greater than or equal to about 0% to less than or equal to about 20%.

The gas generant composition may also include a coolant for lowering gas temperature during combustion to facilitate cool burning gas generant formulations. As noted above, suitable bismuth-containing compounds may be a coolant, such as bismuth hydroxide ($Bi(OH)_3$), bismuth subcarbonate ($Bi_2O_2CO_3$), and/or bismuth suboxalate ($BiC_2O_4(OH)$). Bismuth hydroxide ($Bi(OH)_3$) is a hydrated form of bismuth oxide and therefore advantageously has cooling properties as it dehydrates during combustion.

Other suitable coolants may include, for example, large particle size endothermic coolants, aluminum hydroxide, which is described in co-owned U.S. Patent Publication No. 2014/0261927 entitled "Enhanced Slag Formation For Copper-Containing Gas Generants," the relevant portions of which are incorporated herein. The large particle size of the aluminum hydroxide allows it to be used at high levels (e.g., about 10-20%) without adversely affecting the burning rate of the overall gas generant formulation. In addition, decomposition of aluminum hydroxide releases water vapor, which participates in inflation of the airbag and helps to maintain a high gas yield from the gas generant formulation. Other coolants include basic copper carbonate or other suitable carbonates. A total amount of coolants may be present in the cool burning gas generant composition in an amount of greater than or equal to about 1% to less than or equal to about 20%.

A gas generant composition may optionally include additional components known to those of skill in the art. Such additives typically function to improve the handling or other material characteristics which remain after combustion of the gas generant material; and improve ability to handle or process pyrotechnic raw materials. By way of non-limiting example, additional ingredients for the gas generant composition may be selected from the group consisting of: flow aids, pressing aids, metal oxides, and combinations thereof. If minor ingredients or additives are included in the gas generant, they may be cumulatively present at less than or equal to about 10% by weight of the total gas generant composition, optionally less than or equal to about 5% by weight of the total gas generant composition. By way of example, such an additive may be selected from the group consisting of: flow aids, press aids, metal oxides, and any combinations thereof. Where present in a gas generant composition, in certain variations each respective additive may be present at greater than or equal to 0% to less than or equal to about 4% by weight; optionally greater than or equal to about 0.1% to less than or equal to about 3% by weight, and in certain variations, optionally greater than or equal to about 0.5% to less than or equal to about 1% by weight of the gas generant, so that the total amount of additives is less than or equal to about 4%.

Press aids used during compression processing, include lubricants and/or release agents, such as graphite, calcium stearate, magnesium stearate, molybdenum disulfide, tungsten disulfide, graphitic boron nitride, may be optionally included in the gas generant compositions, by way of non-limiting example. Conventional flow aids may also be employed, such as high surface area fumed silica.

The gas generant compositions may optionally include a metal oxide that serves as a viscosity-modifying compound (in addition to the endothermic slag-forming component described above). As noted above, in certain aspects, the gas generant composition may be free of or substantially free of bismuth oxide. Suitable metal oxides may include silicon dioxide, cerium oxide, ferric oxide, titanium oxide, zirconium oxide, molybdenum oxide, lanthanum oxide and the like.

The components that form the gas generant compositions provided in accordance with the present disclosure may be water soluble or capable of being processed by a slurry that can be spray dried to form granules.

In certain embodiments, a cool burning gas generant comprises a bismuth-containing compound and a copper-containing compound. The gas generant comprises at least one fuel and at least one oxidizer. The bismuth-containing compound may be present as a fuel/co-fuel, oxidizer, or coolant, by way of example. The bismuth-containing compound may be selected from the group consisting of bismuth citrate, bismuth subsalicylate, bismuth hydroxide, copper bismuth hydroxy nitrate, bismuth subcarbonate, and combinations thereof. In certain variations, the cool burning gas generant consists essentially of a bismuth-containing compound selected from the group consisting of bismuth citrate, bismuth subsalicylate, bismuth hydroxide, copper bismuth hydroxy nitrate, bismuth subcarbonate, and combinations thereof. The at least one oxidizer may comprise the copper-containing compound. In certain variations, the copper-containing compound is selected from the group consisting of: basic copper nitrate, copper bis guanylurea dinitrate, and combinations thereof. The gas generant composition has a maximum flame temperature at combustion ($T_c$) of less than or equal to about 1700K (1,327° C.).

In other aspects, a cool burning gas generant comprises a bismuth-containing compound selected from the group consisting of bismuth citrate, bismuth subsalicylate, bismuth hydroxide, copper bismuth hydroxy nitrate, bismuth subcarbonate, bismuth suboxalate, and combinations thereof. The cool burning gas generant also comprises an oxidizer comprising copper and at least one fuel. In certain aspects, the at least one fuel comprises guanidine nitrate. The oxidizer comprising copper is optionally selected from the group consisting of: basic copper nitrate, copper bis guanylurea dinitrate, and combinations thereof. The gas generant composition has a maximum flame temperature at combustion ($T_c$) of less than or equal to about 1700K (1,327° C.).

Thus, in accordance with various aspects of the present teachings, an improved cool burning gas generant composition is provided that includes a bismuth-containing compound and has a volumetric gas yield of optionally greater than or equal to about 5.7 moles/100 cm$^3$ of gas generant. The product of gravimetric gas yield and density is a volumetric gas yield. In other embodiments, the volumetric gas yield is greater than or equal to about 5.9 moles/100 cm$^3$ of gas generant, optionally greater than or equal to about 6.0 moles/100 cm$^3$ of gas generant, optionally greater than or equal to about 6.1 moles/100 cm$^3$ of gas generant, and in certain variations, optionally greater than or equal to about 6.2 moles/100 cm$^3$ of gas generant.

In addition to improved gas generant performance with respect to volumetric gas yield, relative quickness as determined by observed burning rate is also important in inflator gas generant design. In general, a burn rate for a gas generant composition can be represented by a simplified equation:

$$r_b = k(P)^n \qquad \text{(Eqn. 1)}$$

where $r_b$ is burn rate (linear); k is a constant; P is pressure, and n is a pressure exponent, where the pressure exponent is the slope of a linear regression line drawn through the log-log plot of linear burn rate ($r_b$) versus pressure (P).

In various embodiments, the gas generant has a desirably high burning rate which enables desirable pressure curves for inflation of an airbag. A linear burn rate "$r_b$" for a gas generant material may be expressed in length per time at a given pressure. In accordance with various aspects of the present disclosure, the gas generant has a linear burn rate of greater than or equal to about 11 mm per second at a pressure of about 20 megapascals (MPa) and optionally greater than or equal to about 12 mm per second at a pressure of about 20 MPa.

Another important aspect of a gas generant material's performance is combustion stability, as reflected by its burn rate pressure sensitivity, which is related to the pressure exponent or the slope of the linear regression line of the logarithmic-logarithmic plot of burn rate ($r_b$) versus pressure (P). It is generally desirable to develop gas generant materials that exhibit reduced or lessened burn rate pressure sensitivity, as gas generant materials exhibiting higher burn rate pressure sensitivity can potentially lead to undesirable performance variability, such as when the corresponding material or formulation is reacted under different pressure conditions. As referred to herein, "pressure sensitivity" is meant to refer to undesirable pressure sensitivity of a gas generant over the range of typical operating pressure for a gas inflator, for example, about 1,000 psi (about 6.9 MPa) to about 5,000 psi (about 34.5 MPa) resulting in inflator performance variability. It is desirable to employ gas generant compositions that have relatively consistent performance during combustion, including burn rates that are relatively independent of pressure (e.g., pressure insensitive). As noted above, inclusion of bismuth oxide can result in undesirably high burn rate slopes and thus may be avoided.

In various aspects, a gas generant composition is provided that has enhanced burning rate performance, and a reduced burn rate pressure sensitivity as it is used in an inflator device. In various aspects, the gas generants of the present disclosure have improved pressure sensitivity (i.e., reduced pressure sensitivity) and enhanced combustion performance, for example, by having reduced linear burn rate pressure sensitivity (i.e., a relatively low pressure exponent (n) or slope of a linear regression line drawn through a log-log plot of burn rate ($r_b$) versus pressure (P)), and higher linear burn rate (i.e., rate of combustion reaction).

In certain variations, incorporation of a bismuth-containing compound in the form of a co-fuel is advantageous, because it reduces pressure sensitivity (burning rate slope) of the burning rate as compared to bismuth provided in other components. For example, the bismuth-containing compound may be a bismuth salt of an organic acid (co-fuel) that is included in the cool burning gas generant composition, such as bismuth citrate $Bi(C_6H_5O_7)$, or bismuth subsalicylate ($C_7H_5BiO_4$). When bismuth is present, a reduced pressure sensitivity of the burning rate is observed, as compared to bismuth present as bismuth hydroxide or bismuth oxide.

In certain aspects, a gas generant material having an acceptable pressure sensitivity has a linear burning rate slope of less than or equal to about 0.57. In certain aspects, it is desirable that the gas generant materials have a constant slope over the pressure range of inflator operation, which is typically about 1,000 psi (about 6.9 MPa) to about 5,000 psi (about 34.5 MPa) and desirably has a constant slope that is less than or equal to about 0.57.

In various aspects, a cool burning gas generant composition is provided that facilitates formation of liquid combustion byproducts capable of plating on internal surfaces of an inflator. The liquid combustion products thus form minimal or no slag that must be filtered from the gas generated as it enters the airbag. In this regard, cool burning gas generant compositions are particularly suitable for use in filterless inflator designs, such as those described in U.S. Pat. No. 8,794,666 to Patton et al. and U.S. Pat. No. 9,221,420 to Laubacher, et al., the relevant portions of which are both incorporated herein by reference, by way of non-limiting example.

In certain aspects, a cool burning gas generant composition comprises a bismuth-containing compound, a copper-containing compound, such as basic copper nitrate and/or copper bis guanylurea dinitrate, and guanidine nitrate. The gas generant composition has a maximum flame temperature at combustion ($T_c$) of less than or equal to about 1700K (1,427° C.) and optionally less than or equal to about 1600K (1,327° C.). In certain aspects, a linear burn rate of greater than or equal to about 11 mm per second at a pressure of about 20 megapascals (MPa), a gas yield of the gas generant of greater than or equal to about 5.7 moles/100 cm$^3$. The cool burning gas generant composition produces molten or liquid combustion products.

In yet other aspects, a cool burning gas generant composition comprises a bismuth-containing compound, at least one co-fuel component mixed with one or more oxidizers, such as a primary oxidizer and a secondary oxidizer. By way of example, a co-fuel may include guanidine nitrate. A particularly suitable oxidizer may be a copper-containing oxidizer comprising basic copper nitrate, copper bis guanylurea dinitrate, or both basic copper nitrate and copper bis guanylurea nitrate respectively present as primary and secondary oxidizers. The cool burning gas generant composition may also have one or more coolants or other conventional additives included. The gas generant composition has a maximum flame temperature at combustion ($T_c$) of less than or equal to about 1700K (1,427° C.) and forms a majority of molten or liquid combustion products.

In certain variations, the bismuth-containing compound may be present at greater than or equal to about 2 to less than or equal to about 30 weight % of the total gas generant composition. The copper containing oxidizers may be present at greater than or equal to about 25 to less than or equal to about 75 weight % of the total gas generant composition.

One or more additional oxidizers may be present at greater than or equal to about 0 to less than or equal to about 20% by weight of the total gas generant composition. The gas generant formulations also contain at least one fuel, present at greater than or equal to about 10% to less than or equal to about 50% by weight of the total gas generant composition. One or more coolants may also be present, such as a metal hydroxide or metal carbonate, to adjust the flame temperature to a level that is less than about 1600K-1700K. A coolant may be present at greater than or equal to about 1% to less than or equal to about 20% by weight of the total gas generant composition. Other conventional gas generant additives may be present at greater than or equal to about 0% to less than or equal to about 5% by weight of the total gas generant composition. The cool burning gas generant composition produces molten or liquid combustion products.

In certain variations, the bismuth-containing compound is present at greater than or equal to about 5% by weight to less than or equal to about 25% by weight of the total gas generant composition, a fuel, such as guanidine nitrate, is present at greater than or equal to about 10% to less than or equal to about 35% by weight of the total gas generant composition; one or more oxidizers, such as basic copper nitrate and/or copper bis guanylurea dinitrate are cumulatively present at greater than or equal to about 60% to less than or equal to about 75% by weight of the total gas generant composition; and greater than or equal to 0% to less than or equal to about 20% by weight of the total gas generant composition of one or more gas generant additives. The gas generant composition has a maximum flame temperature at combustion ($T_c$) of less than or equal to about 1700K (1,427° C.) and forms a majority of molten or liquid combustion products.

In certain variations, the present disclosure contemplates a cool burning gas generant composition for an automotive inflatable restraint system that comprises a bismuth-containing compound selected from the group consisting of: bismuth citrate, bismuth subsalicylate, bismuth hydroxide, copper bismuth hydroxy nitrate, bismuth subcarbonate, bismuth suboxalate, and combinations thereof, guanidine nitrate, basic copper nitrate, copper bis guanylurea dinitrate. The cool burning gas generant may further comprise a coolant at greater than or equal to about 1% to less than or equal to about 20% by weight of the total gas generant composition and an additive, such as silicon dioxide at greater than or equal to about 0% to less than or equal to about 5% by weight of the total gas generant composition. The gas generant composition has a maximum flame temperature at combustion ($T_c$) of less than or equal to about 1700K (1,427° C.) and forms a majority of molten or liquid combustion products.

In certain variations, the bismuth-containing compound is present at greater than or equal to about 10% by weight to less than or equal to about 20% by weight of the total gas generant composition, a fuel, such as guanidine nitrate, is present at greater than or equal to about 10% to less than or equal to about 25% by weight of the total gas generant composition; one or more oxidizers, such as basic copper nitrate and/or copper bis guanylurea dinitrate are cumulatively present at greater than or equal to about 65% to less than or equal to about 75% by weight of the total gas generant composition; and greater than or equal to 0% to less than or equal to about 20% by weight of the total gas generant composition of one or more gas generant additives. The gas generant composition has a maximum flame temperature at combustion ($T_c$) of less than or equal to about 1700K (1,427° C.) and forms a majority of molten or liquid combustion products.

In certain aspects, the present disclosure contemplates method of inflating an automotive inflatable restraint system, such as a filterless automotive inflatable restraint system. The method comprises combusting a cool burning gas generant in a filterless inflator device at a maximum flame temperature at combustion ($T_c$) of less than or equal to about 1700K (1,427° C.) to generate gas and combustion products in a liquid phase. The cool burning gas generant may be any of the gas generants described above. Thus, the cool burning gas generant may comprise a bismuth-containing compound selected from the group consisting of: bismuth citrate, bismuth subsalicylate, bismuth hydroxide, copper bismuth hydroxy nitrate, bismuth subcarbonate, bismuth suboxalate, and combinations thereof, at least one copper-containing oxidizer, and at least one fuel. The method further includes plating the liquid combustion products on exposed surfaces of the filterless inflator device. A tank residue after the plating is less than or equal to about 1 gram of tank residue, for example, for a driver side or passenger side inflator. Copper and bismuth present in the cool burning gas generant react to form an alloy having a melting point at or within 50K of the maximum flame temperature at combustion ($T_c$) of the cool burning gas generant.

Various embodiments of the inventive technology can be further understood by the specific examples contained herein. Specific non-limiting Examples are provided for illustrative purposes of how to make and use the compositions, devices, and methods according to the present teachings.

Example 1

Gas generant Formulation 1 is prepared with the following composition: 17% guanidine nitrate as a fuel, 30.52% copper bis guanylurea dinitrate as an oxidizer; 36.64% basic copper nitrate as a co-oxidizer; 15% bismuth hydroxide as a coolant; and 0.84% silicon dioxide as a viscosity modifier. The components are added to water and heated to 90° C. The mixture is circulated at 90° C. until the solids dissolve or are suspended. The resulting mixture or slurry is then spray dried to produce a powder with the compositions above. The powder is pressed into a ½ inch diameter cylinder and burned under 3,000 psi nitrogen.

The gas generant composition of Formulation 1 is burned in a tank inflator. A burning rate is measured to be 0.4568 inches per second at 3,000 psi (about 20.7 MPa). The burn rate slope is about 0.561 and constant is about 0.00513. The thermochemical values for Formulation 1 are maximum combustion flame temperature (Tc) of about 1525 K (about 1,252° C.), gas yield (Ge) of 2.4 moles/100 g, a volumetric gas yield (G) of 5.71 moles/100 cc, and a density of about 2.38 g/cc.

A comparative Formulation 2 is prepared with the following composition: 18.35% guanidine nitrate as a fuel, 30.63% copper bis guanylurea dinitrate as an oxidizer; 41.08% basic copper nitrate as a co-oxidizer; 9% aluminum hydroxide as a coolant; and 0.94% silicon dioxide as a viscosity modifier. The components are added to water and heated to 90° C. The mixture is circulated at 90° C. until the solids dissolve or are suspended. The resulting mixture or slurry is then spray dried to produce a powder with the compositions above. The powder is pressed into a ½ inch diameter cylinder and burned under 3,000 psi nitrogen.

The gas generant composition of Formulation 1 is burned in a burning rate bomb. A burning rate is measured to be 0.4568 inches per second (11 mm/s) at 3,000 psi (about 20.7 MPa). The burn rate slope is about 0.382 and constant is about 0.03739. The thermochemical values for Comparative Formulation 2 are a burn rate of 0.7982 inches per second (20 mm/s) at 3,000 psi (20.7 MPa), a maximum combustion flame temperature (Tc) of about 1513 K (about 1,240° C.), gas yield (Ge) of 2.6 moles/100 g, a volumetric gas yield (Gv) of 5.82 moles/100 cc, and a density of about 2.24 g/cc.

Figure 1:
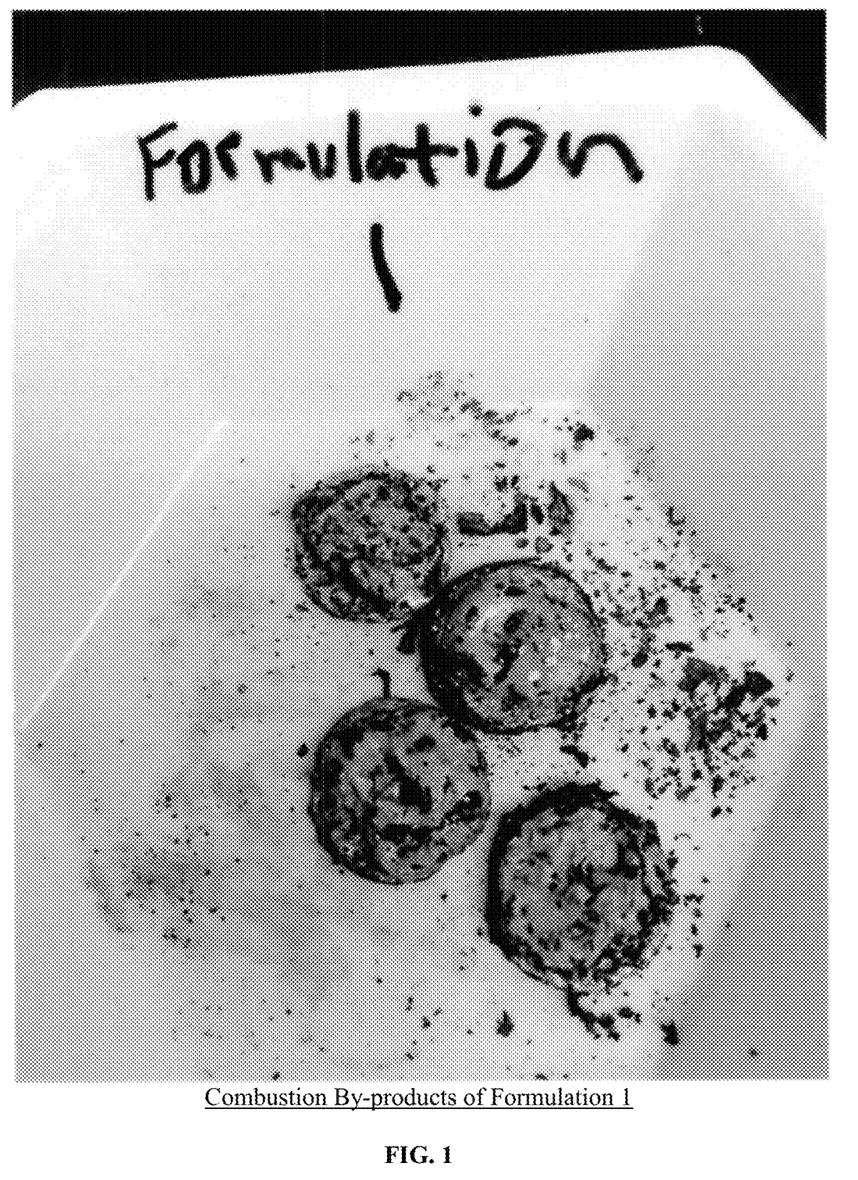
FIG. 1 shows a picture of combustion products after combustion of a cool burning gas generant composition comprising a bismuth-containing compound prepared in accordance with certain aspects of the present disclosure.
Figure 2:
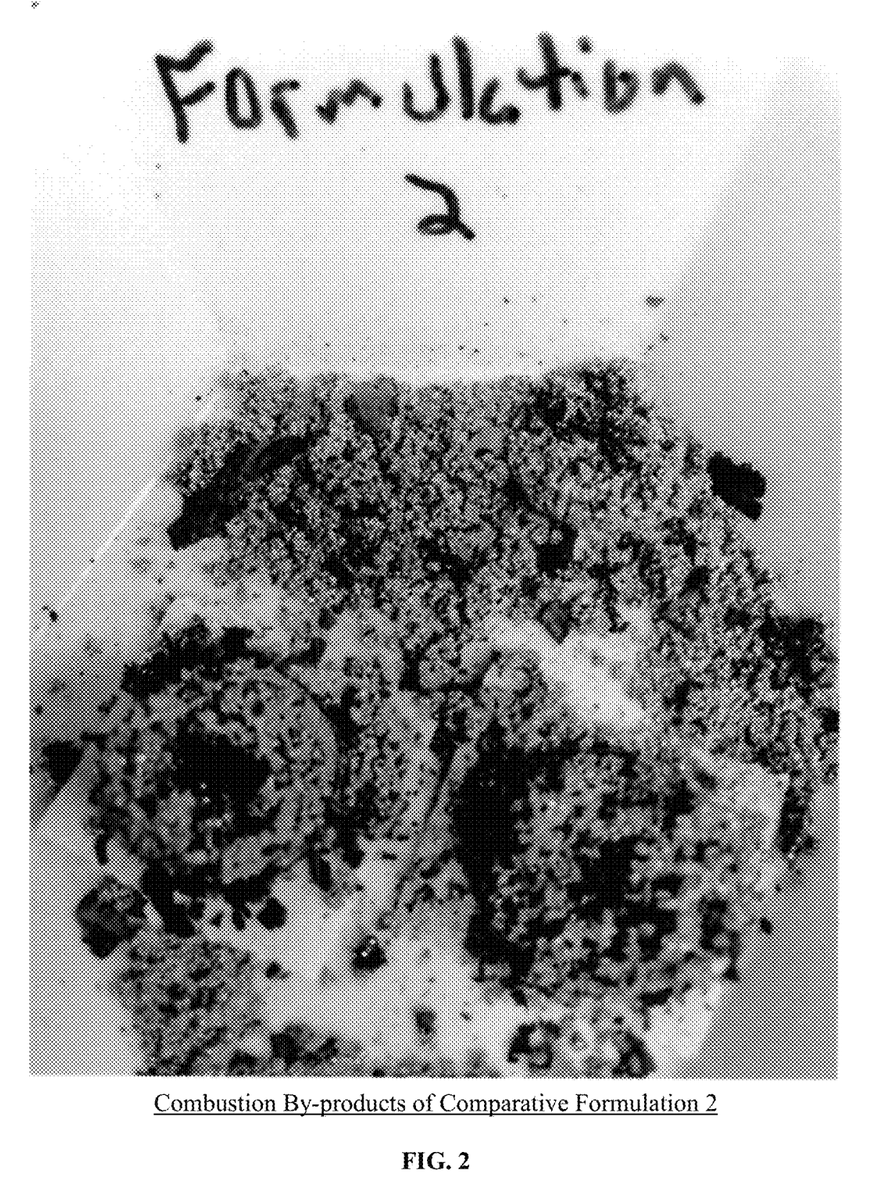
FIG. 2 is a picture of combustion byproducts after combustion of a comparative gas generant formulation.

As the thermochemical data shows, the flame temperatures for these two compositions are very similar. The difference is that Formulation 1 contains a coolant in the form of bismuth hydroxide and Formulation 2 contains a coolant in the form of aluminum hydroxide. Pictures of the combustion by-products for each of Formulation 1 and Comparative Formulation 2 are shown in FIGS. 1 and 2.

The formulations are then tested in concept "filterless" inflator designs. Total residue weight (a measure of particulate output of inflator) for Formulation 1 averages 0.70 g from a 66 gram gas generant load. Total residue weight from a formulation cooled with aluminum hydroxide instead of bismuth hydroxide averages 1.11 gram. A post deployment teardown of the inflators shows the presence of condensed slag on impinging surfaces when Formulation 1 is used, whereas formulations where aluminum hydroxide is substituted for bismuth hydroxide showed very little residue present on impinging surfaces.

Example 2

A gas generant designated Formulation 3 is prepared with the following composition: 17% guanidine nitrate as a fuel, 10% bismuth salicylate as a co-fuel, 50.71% basic copper nitrate as an oxidizer; 21.29% copper bis guanylurea dinitrate as a co-oxidizer, and 1% silicon dioxide as a viscosity modifier. The components are added to water and heated to 90° C. The mixture is circulated at 90° C. until the solids dissolve or are suspended. The resulting mixture or slurry is then spray dried to produce a powder with the compositions above. The powder is pressed into a ½ inch diameter cylinder and burned under 3,000 psi nitrogen.

The gas generant composition of Formulation 3 is burned in a burning rate bomb. A burning rate is measured to be 0.4788 inches per second (12 mm/s) at 3,000 psi (about 20.7 MPa). The burn rate slope is about 0.441 and burn rate constant is about 0.01396. The thermochemical values for Formulation 3 are maximum combustion flame temperature ($T_c$) of about 1787 K (about 1514° C.), gas yield (Ge) of 2.34 moles/100 g, a volumetric gas yield (G) of 5.65 moles/100 cm$^3$, and a density of about 2.42 g/cm$^3$.

Example 3

A gas generant designated Formulation 4 is prepared with the following composition: 17% guanidine nitrate as a fuel, 10% bismuth citrate as a co-fuel, 46.51% basic copper nitrate as an oxidizer; and 26.49% copper bis guanylurea dinitrate as a co-oxidizer. The components are added to water and heated to 90° C. The mixture is circulated at 90° C. until the solids dissolve or are suspended. The resulting mixture or slurry is then spray dried to produce a powder with the compositions above. The powder is pressed into a ½ inch diameter cylinder and burned under 3,000 psi nitrogen.

The gas generant composition of Formulation 4 is burned in a burning rate bomb. A burning rate is measured to be 0.4788 inches per second at 3,000 psi (about 20.7 MPa). The burn rate slope is about 0.4676 and burn rate constant is about 0.01255. The thermochemical values for Formulation 3 are maximum combustion flame temperature (Tc) of about 1644 K (about 1371° C.), gas yield (Ge) of 2.45 moles/100 g, a volumetric gas yield (G) of 5.82 moles/100 cm$^3$, and a density of about 2.37 g/cm$^3$.

In Examples 2 and 3, bismuth is present in Formulations 3 and 4 as a co-fuel and thus exhibits lower burn rate pressure sensitivity versus Formulation 1 in Example 1, where bismuth is present as a coolant in the form of Bi(OH)$_3$.

Example 4

Comparative performance of a gas generant prepared in accordance with certain aspects of the present disclosure (Formulation 1 described above in the context of Example 1) and two Comparative Formulations in a filterless driver side automotive airbag inflator are evaluated.

A gas generant designated Comparative Formulation 5 is prepared with the following composition: 17.8% guanidine nitrate as a fuel, 38.86% basic copper nitrate as an oxidizer; 28.39% copper bis guanylurea dinitrate as a co-oxidizer, 7% aluminum hydroxide as a coolant; and 3.95% silicon dioxide as a viscosity modifier. The components are added to water and heated to 90° C. The mixture is circulated at 90° C. until the solids dissolve or are suspended. The resulting mixture or slurry is then spray dried to produce a powder with the compositions above.

A gas generant designated Comparative Formulation 6 is prepared with the following composition: 17.25% guanidine nitrate as a fuel, 38.64% basic copper nitrate as an oxidizer; 28.81% copper bis guanylurea dinitrate as a co-oxidizer, 14.3% aluminum hydroxide as a coolant; and 1% silicon dioxide as a viscosity modifier. The components are added to water and heated to 90° C. The mixture is circulated at 90° C. until the solids dissolve or are suspended. The resulting mixture or slurry is then spray dried to produce a powder with the compositions above.

Gas generants of Formulation 1 and Comparative Formulations 5 and 6 described above are pressed into 0.25 inch diameter cylinders, loaded into a driver side automotive airbag inflator, and deployed into one of several filterless inflator designs. A first filterless inflator design has a "swirl pattern" design where a circumferential chamber wall includes a plurality of rings of elongated openings that facilitate swirling of the combustion byproducts within the circumferential chamber as they exit the inflator. A second filterless inflator design is an opposed-hole trap design having a single circumferential ring of interspersed round apertures formed in a wall of the circumferential chamber, so that combustion gases pass through the round apertures as they exit the inflator. The single circumferential ring of round apertures is situated opposite to the central housing where the gas generant is contained. Finally, a third filterless inflator design includes a circumferential chamber wall having a plurality of circumferential rings each defined by interspersed round apertures (a multi-ring trap). The multiple rings of round apertures are of a smaller diameter than those in the second filterless inflator design. Further, the multiple rings of round apertures are disposed above and below the central housing holding the gas generant, so as to force combustion gases to flow upward and downwards within the chamber after exiting the central housing during combustion of the gas generant.

After deployment, each tank is washed down and the wash water collected. The insoluble particulate is captured on a filter and weighed after drying. Any soluble particulate is precipitated by evaporation of the wash water and weighed. The total particulate escaping the filterless inflator is determined by adding the weights of the soluble and insoluble particulate found in the tank. This value is called the "tank wash value."

Tank wash values for gas generants from Formulation 1 and Comparative Formulations 5 and 6 are given in Table 1.

TABLE 1

|  | Formulation 1 | Comparative Formulations 5 and 6 |
|---|---|---|
| | Filterless Tank Design (Swirl Trap) | |
| Tank Wash (g) | 0.43-0.88 | 1-1.26 |
| | Filterless Tank Design (Opposed Hole Trap) | |
| Tank Wash (g) | 1.03 | 2.72 |
| | Filterless Tank Design (Multi-Ring Trap) | |
| Tank wash (g) | 1.03-1.56 | 1.71-2.31 |

Figure 3A:
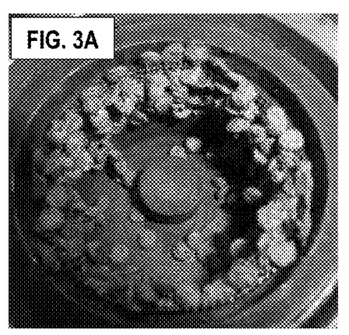
FIGS. 3A-3F show pictures of combustion products after combustion of cool burning gas generant composition comprising a bismuth-containing compound prepared in accordance with certain aspects of the present disclosure in different filterless inflator designs.
Figure 3B:
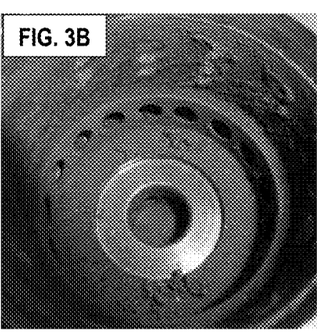
Figure 3C:
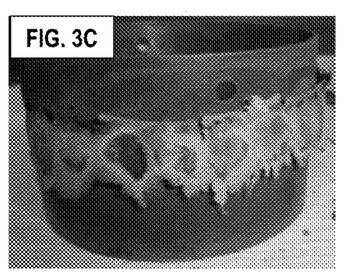
Figure 3D:
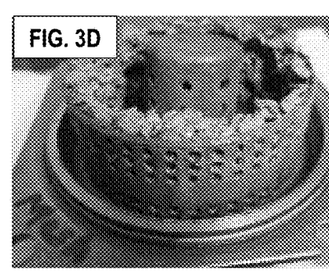
Figure 3E:
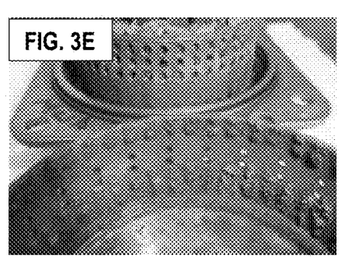
Figure 3F:
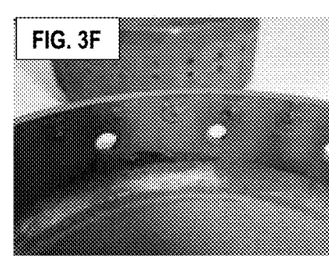

FIGS. 3A-3F show pictures of Formulation 1 after combustion in the three filterless designs. Namely, FIGS. 3A-3B show the combustion products on components in the swirl trap filterless inflator, FIG. 3C shows the opposed-hole trap filterless inflator, and FIGS. 3D-3F show the combustion products on the multi-ring filterless inflator. When Formulation 1 combustion products impinge on the cold inflator surfaces (e.g., walls of the circumferential chamber), the slag sticks and solidifies/freezes there.

Figure 4A:
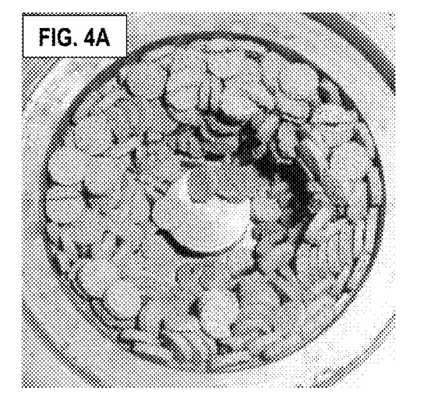
FIGS. 4A-4D show pictures of combustion products after combustion in filterless inflator designs.
Figure 4B:
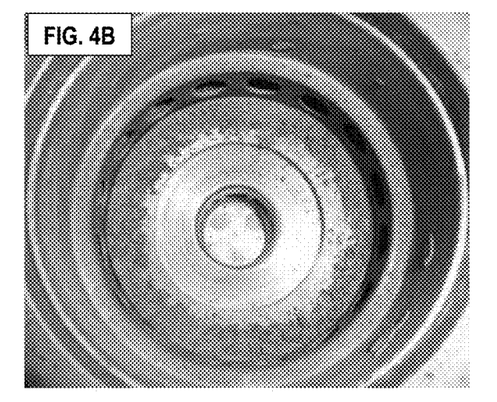
Figure 4C:
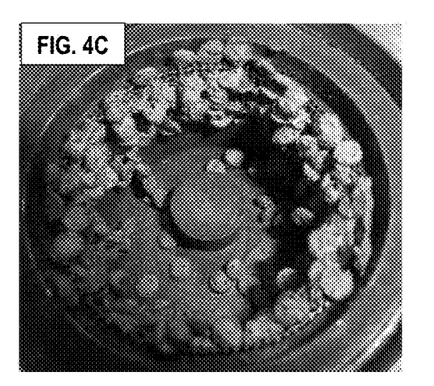
Figure 4D:
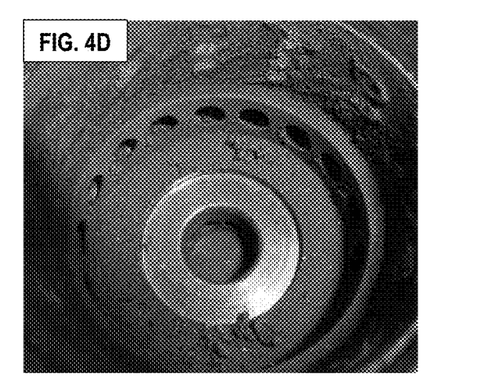

FIGS. 4A-4D show comparisons of post-combustion products for Formulation 1 and Comparative Formulations 5 and 6 in an opposed hole trap filterless design. FIGS. 4A-4B show pictures of the Comparative Formulations 5 and 6, while FIGS. 4C-4D show pictures of Formulation 1 having the bismuth hydroxide coolant. As can be seen in FIGS. 4C-4D, the combustion products were molten/liquid and have stuck to the circumferential walls of the chamber that were cold when combustion was initiated, as where in FIGS. 4A-4B, a solid slag is formed that ultimately generates more particulate released into the tank.

Example 5

A gas generant designated Formulation 7 is prepared with the following composition: 20% guanidine nitrate as a fuel, 38.16% basic copper nitrate as an oxidizer; 29.84% copper bis guanylurea dinitrate as a co-oxidizer, and 12% bismuth subcarbonate as a coolant. The components are added to water and heated to 90° C. The mixture is circulated at 90° C. until the solids dissolve or are suspended. The resulting mixture or slurry is then spray dried to produce a powder with the compositions above. The powder is pressed into a ½ inch diameter cylinder and burned under 3,000 psi nitrogen.

Figure 5A:
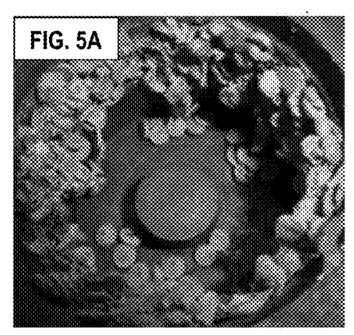
FIGS. 5A-5C show pictures of filterless inflator components after combustion of a cool burning gas generant composition comprising a bismuth-containing compound prepared in accordance with certain aspects of the present disclosure.
Figure 5B:
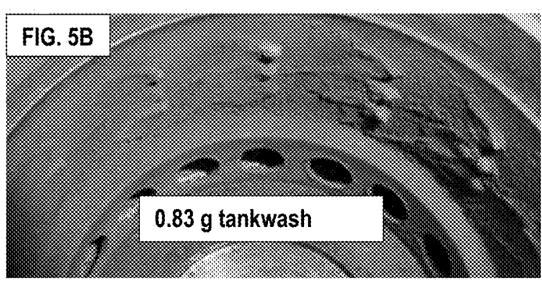
Figure 5C:
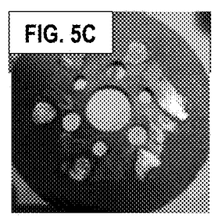

Gas generants of Formulations 7 and Comparative Formulations 5 and 6 described above are pressed into 0.25 inch diameter cylinders, loaded into a driver side automotive airbag inflator, and deployed in a filterless inflator design that includes a 7 hole orifice plate. The combustion products are molten/liquid. After combustion, only 0.83 g of tank wash is generated from 66 g of gas generant. FIGS. 5A-5C show pictures of the combustion products from this experiment in various components of the filterless inflator.

Example 6

A gas generant designated Formulation 8 is prepared with the following composition: 19.8% guanidine nitrate as a fuel, 38.51% basic copper nitrate as an oxidizer; 28.81% copper bis guanylurea dinitrate as a co-oxidizer, 11.88% bismuth suboxalate as a coolant, and 1% glass fibers. The components are added to water and heated to 90° C. The mixture is circulated at 90° C. until the solids dissolve or are suspended. The resulting mixture or slurry is then spray dried to produce a powder with the compositions above.

Gas generant of Formulation 8 is pressed into a 0.25 inch diameter cylinder, loaded into a driver side automotive airbag inflator, and deployed in two filterless inflator tank designs having distinct control orifice areas, one having a 59 $mm^2$ control orifice area and one having a 75 $mm^2$ control orifice area. The combustion products are molten/liquid. After combustion in the 59 $mm^2$ control orifice area filterless inflator, 1.16 g of tank wash is generated from 66 g of gas generant. After combustion in the 75 $mm^2$ control orifice area filterless inflator, 0.66 g of tank wash is generated from 66 g of gas generant.

In certain aspects, inclusion of a bismuth-containing compound may reduce a maximum flame temperature at combustion ($T_c$) of the gas generant. As appreciated by those of skill in the art, a temperature reduction depends on the bismuth compounds used, their respective heats of formation, and amounts of the compound in the formulation. For comparison, the maximum combustion flame temperature of a gas generant comprising a bismuth-containing compound selected from the group consisting of: bismuth citrate, bismuth subsalicylate, bismuth hydroxide, copper bismuth hydroxy nitrate, bismuth subcarbonate, bismuth suboxalate, and combinations thereof prepared in accordance with certain aspects of the present disclosure is compared to a comparative gas generant composition having the same components except omitting the bismuth-containing compound. For example, the comparisons may include 10% by weight of the bismuth-containing compound in a gas generant formulation also having basic copper nitrate, guanidine nitrate, and 1% silicon dioxide, where the formulation is balanced to an equivalence ratio of 1. Thus, the comparative gas generant contains only basic copper nitrate, guanidine nitrate, and silicon dioxide proportionally adjusted. The temperature reductions achieved by including the bismuth containing compounds in such examples are shown in Table 2.

TABLE 2

| Component | Reduction in Flame Temperature (K) |
|---|---|
| Bismuth hydroxide | −102 K |
| Bismuth citrate | −100 K |
| Bismuth subsalicylate | −39 K |

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A cool burning gas generant composition for an automotive inflatable restraint system comprising:
   a bismuth-containing compound selected from the group consisting of: bismuth citrate, copper bismuth hydroxy nitrate, bismuth suboxalate, and combinations thereof;
   an oxidizer; and
   a fuel, wherein the cool burning gas generant composition comprises copper and has a maximum flame temperature at combustion ($T_c$) of less than or equal to about 1700K (1,427° C.).

2. The cool burning gas generant composition of claim 1, wherein the bismuth-containing compound is an oxidizer comprising copper bismuth hydroxy nitrate ($[Cu_2Bi(OH)_6]NO_3$).

3. The cool burning gas generant composition of claim 1, wherein the bismuth-containing compound is a co-fuel comprising bismuth citrate ($Bi(C_6H_5O_7)$).

4. The cool burning gas generant composition of claim 1, wherein the bismuth-containing compound is a coolant comprising bismuth suboxalate ($BiC_2O_4(OH)$).

5. The cool burning gas generant composition of claim 1, wherein the bismuth-containing compound is present at greater than or equal to about 2 to less than or equal to about 30 weight % of the cool burning gas generant composition.

6. The cool burning gas generant composition of claim 1, wherein a linear burn rate of greater than or equal to about 11 mm per second at a pressure of about 20 megapascals (MPa) and a gas yield of the cool burning gas generant composition of greater than or equal to about 5.7 moles/100 cm$^3$.

7. The cool burning gas generant composition of claim 1, wherein the fuel is selected from the group consisting of: guanidine nitrate, diammonium 5,5'-bitetrazole (DABT), copper bis guanylurea dinitrate, hexamine cobalt (III) nitrate, copper diammine bitetrazole, and combinations thereof.

8. The cool burning gas generant composition of claim 1, wherein the oxidizer is selected from the group consisting of: basic copper nitrate, copper bis guanylurea dinitrate, alkali metal or alkaline earth metal nitrates, alkali metal, alkaline earth metal, or ammonium perchlorates, metal oxides, and combinations thereof.

9. The cool burning gas generant composition of claim 1 configured to generate combustion products in a liquid phase, wherein copper and bismuth present in the cool burning gas generant composition react to form an alloy having a melting point at or within 50K of the maximum flame temperature at combustion ($T_c$) of the cool burning gas generant composition.

10. The cool burning gas generant composition of claim 1, further comprising a coolant present at greater than or equal to about 0 to less than or equal to about 20 weight % of the cool burning gas generant composition.

11. A cool burning gas generant composition for an automotive inflatable restraint system comprising:
    a bismuth-containing compound selected from the group consisting of: bismuth citrate, bismuth subsalicylate, bismuth hydroxide, copper bismuth hydroxy nitrate, bismuth suboxalate, and combinations thereof present at greater than or equal to about 3 to less than or equal to about 30 weight % of the cool burning gas generant composition;
    a fuel present at greater than or equal to about 10% to less than or equal to about 50% by weight of the cool burning gas generant composition; and
    a copper-containing oxidizer present at greater than or equal to about 30% to less than or equal to about 75% by weight of the cool burning gas generant composition, wherein the cool burning gas generant composition has a maximum flame temperature at combustion ($T_c$) of less than or equal to about 1700K (1,427° C.), wherein the cool burning gas generant composition generates combustion products in a liquid phase and copper and bismuth present in the cool burning gas generant composition react to form an alloy having a melting point at or within 50K of the maximum flame temperature at combustion ($T_c$) of the cool burning gas generant composition.

12. The cool burning gas generant composition of claim 11, wherein a copper-containing oxidizer comprises basic copper nitrate as a first oxidizer and copper bis guanylurea dinitrate as a second oxidizer and the fuel is selected from the group consisting of: guanidine nitrate, diammonium 5,5'-bitetrazole (DABT), copper bis guanylurea dinitrate, hexamine cobalt (III) nitrate, copper diammine bitetrazole, and combinations thereof.

13. The cool burning gas generant composition of claim 11, wherein the bismuth-containing compound is a co-fuel selected from the group consisting of: bismuth citrate $Bi(C_6H_5O_7)$, bismuth subsalicylate ($C_7H_5BiO_4$), and combinations thereof.

14. The cool burning gas generant composition of claim 11, further comprising a coolant present at greater than or equal to about 0 to less than or equal to about 20 weight % of the cool burning gas generant composition.

15. The cool burning gas generant composition of claim 11, wherein copper and bismuth present in the cool burning gas generant composition react to form an alloy having a melting point at or near the maximum flame temperature at combustion ($T_c$) of the cool burning gas generant composition.

16. A method of inflating a filterless automotive inflatable restraint system using the cool burning gas generant composition of claim 1, the method comprising:
    combusting the cool burning gas generant in a filterless inflator device at maximum flame temperature at combustion ($T_c$) of less than or equal to about 1700K (1,427° C.) to generate gas and combustion products in a liquid phase, and combinations thereof, at least one copper-containing oxidizer, and at least one fuel; and
    plating the combustion products in the liquid phase on exposed surfaces of the filterless inflator device.

17. The method of claim 16, wherein a tank residue after the plating is less than or equal to about 1 gram.

18. The method of claim 16, wherein copper and bismuth react to form an alloy having a melting point at or within 50K of the maximum flame temperature at combustion ($T_c$) of the cool burning gas generant.

19. A cool burning gas generant composition for an automotive inflatable restraint system comprising:
    a bismuth-containing compound selected from the group consisting of: bismuth citrate, bismuth subsalicylate, bismuth hydroxide, bismuth subcarbonate, and combinations thereof present at greater than or equal to about 10 to less than or equal to about 15 weight % of the cool burning gas generant composition;

a fuel comprising guanidine nitrate present at greater than or equal to about 10% to less than or equal to about 50% by weight of the cool burning gas generant composition;

a copper-containing oxidizer selected from the group consisting of: basic copper nitrate, copper bis guanylurea dinitrate, and combinations thereof that is present at greater than or equal to about 30% to less than or equal to about 75% by weight of the cool burning gas generant composition; and a coolant present at greater than or equal to about 0 to less than or equal to about 20 weight % of the cool burning gas generant composition, wherein the cool burning gas generant composition has a maximum flame temperature at combustion ($T_c$) of less than or equal to about 1700K (1,427° C.), wherein the cool burning gas generant composition generates combustion products in a liquid phase and copper and bismuth present in the cool burning gas generant composition react to form an alloy having a melting point at or within 50K of the maximum flame temperature at combustion ($T_c$) of the cool burning gas generant composition.

* * * * *